United States Patent
Cormie et al.

(10) Patent No.: US 11,233,840 B2
(45) Date of Patent: Jan. 25, 2022

(54) USE OF IN-BAND METADATA AS BASIS TO ACCESS REFERENCE FINGERPRINTS TO FACILITATE CONTENT-RELATED ACTION

(71) Applicant: Roku, Inc., San Jose, CA (US)

(72) Inventors: Steven M. Cormie, Cambridge (GB); Brian Jentz, Buxton (GB)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 15/929,210

(22) Filed: Jan. 28, 2020

(65) Prior Publication Data

US 2021/0084091 A1    Mar. 18, 2021

Related U.S. Application Data

(60) Provisional application No. 62/900,037, filed on Sep. 13, 2019.

(51) Int. Cl.
*H04L 29/06*    (2006.01)

(52) U.S. Cl.
CPC ........ *H04L 65/604* (2013.01); *H04L 65/4069* (2013.01); *H04L 67/42* (2013.01)

(58) Field of Classification Search
CPC .... H04L 65/604; H04L 65/4069; H04L 67/42
See application file for complete search history.

(56) References Cited

U.S. PATENT DOCUMENTS

| 10,506,275 | B1* | 12/2019 | Thielen | H04N 21/44008 |
| 10,594,689 | B1* | 3/2020 | Weaver | H04L 9/3247 |
| 10,623,821 | B2* | 4/2020 | Danovitz | H04N 21/6125 |
| 2014/0020017 | A1* | 1/2014 | Stern | H04N 21/2747 |
| | | | | 725/34 |
| 2015/0092106 | A1* | 4/2015 | Savare | H04N 21/8358 |
| | | | | 348/512 |
| 2015/0341410 | A1* | 11/2015 | Schrempp | H04L 65/605 |
| | | | | 709/231 |

* cited by examiner

*Primary Examiner* — Nasser M Goodarzi
*Assistant Examiner* — Adil Ocak
(74) *Attorney, Agent, or Firm* — McDonnell Boehnen Hulbert & Berghoff LLP

(57) ABSTRACT

As a media client receives a media stream for presentation, the media client could receive, in-band with the media stream, metadata identifying the media stream, such as a media-stream identifier encoded as a watermark in the media stream or carried together with the media stream in a packet-based transport stream, among other possibilities. And while the media client is processing the media stream for presentation, the media client could then convey the received metadata out-of-band to a server to enable the server to readily obtain reference fingerprints representing the media stream and to thereby facilitate, based on the reference fingerprints, a content-related action such as dynamic content modification for instance.

21 Claims, 6 Drawing Sheets

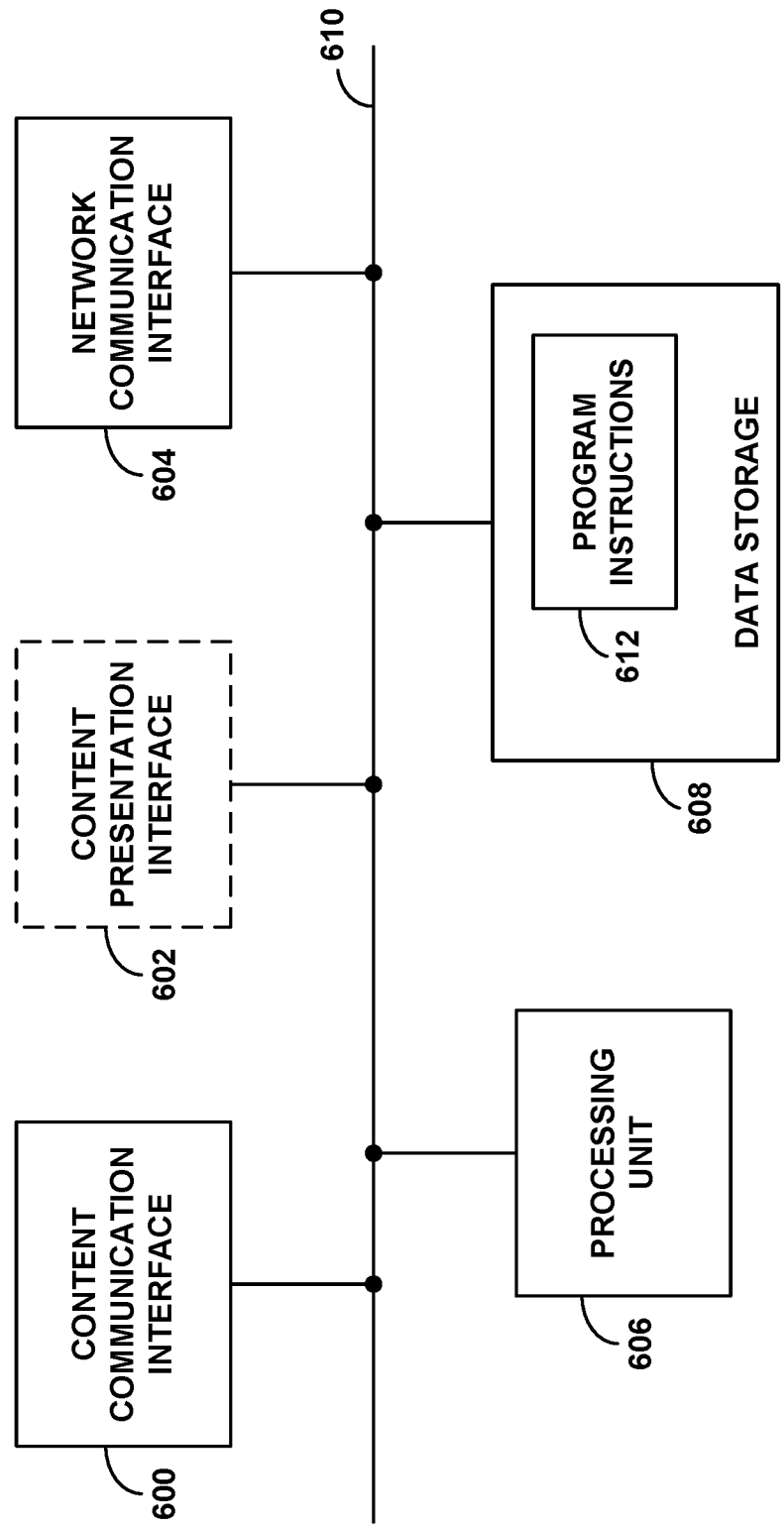

USE OF IN-BAND METADATA AS BASIS TO ACCESS REFERENCE FINGERPRINTS TO FACILITATE CONTENT-RELATED ACTION

REFERENCE TO RELATED APPLICATION

This application claims priority to U.S. Provisional Patent Application No. 62/900,037, filed Sep. 13, 2019, the entirety of which is hereby incorporated by reference.

BACKGROUND

A typical media client operates to receive an analog or digital media stream representing media content such as video and/or audio content and to process the media stream for presentation by the media client or an associated entity on a user interface such as a display screen and/or an audio speaker. Examples of such media clients could include televisions, computer monitors, projection systems, loudspeakers, headphones, set top boxes (e.g. cable or satellite TV receivers), digital video recorders, radios, personal computers, mobile communication devices, gaming consoles, streaming media players, and/or combinations of these other devices.

By way of example, a television could receive a broadcast stream (e.g., over the air, from a set top box, through an Internet connection, or in another manner) and could present the media content of that broadcast stream to a user. As another example, a set top box could receive a broadcast stream from a Multi-channel Video Program Distributor (MVPD) and could output the media content of that stream via a High-Definition Multimedia Interface (HDMI) cable or other interface to a television and/or audio/video receiver for playout. As still another example, a digital video or audio recorder could likewise receive a broadcast stream but could store the broadcast stream for later playout. And as yet another example a loudspeaker or headphones could receive a broadcast audio stream from a radio, computer, or other device, and could present the audio content of that stream to a user. Numerous other examples are possible as well.

SUMMARY

The present disclosure provides that, as a media client receives a media stream for presentation, the media client could receive, in-band with the media stream, metadata identifying the media stream, such as a media-stream identifier encoded as a watermark in the media stream or carried together with the media stream in a packet-based transport stream, among other possibilities. And the disclosure provides that, while the media client is processing the media stream for presentation, the media client could then convey the received metadata out-of-band to a server to enable the server to readily obtain reference fingerprints representing the media stream and to thereby facilitate, based on the reference fingerprints, a content-related action such as dynamic content modification for instance.

Likewise, the disclosure provides that, while a media client is processing a media stream for presentation, a server could receive from the media client an out-of-band signal providing the server with a media-stream identifier that the client extracted from in-band metadata received by the client with the media stream. And the disclosure provides that the server could then use the received media-stream identifier as a basis to readily obtain reference fingerprints representing the media stream being presented, and that the server could use the obtained reference fingerprints as a basis to facilitate a content-related action, such as dynamic content modification for instance.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

BRIEF DESCRIPTION OF THE DRAWINGS

FIG. 6 is a simplified block diagram of an example media client that could operate in accordance with the disclosure.

DETAILED DESCRIPTION

Figure 1:
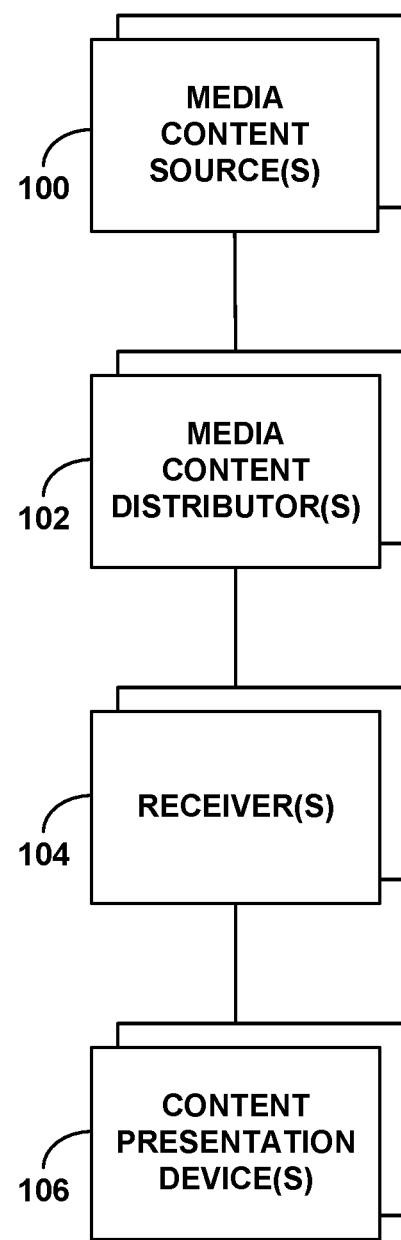
FIG. 1 is a simplified block diagram of an example system in which various disclosed principles can be applied.

Referring to the drawings, as noted above, FIG. 1 is a simplified block diagram of an example system in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that functions described herein as being carried out by one or more entities could be implemented by and/or on behalf of those entities, through hardware, firmware, and/or software, such as by one or more processing units executing program instructions or the like.

As shown in FIG. 1, the example system includes one or more media content sources 100 (e.g., broadcasters, web servers, etc.), one or more media content distributors 102 (e.g., MVPDs, such as cable providers, satellite providers, over-the-air broadcast providers, web aggregators, etc.), one or more media content receivers 104 (e.g., cable receivers, satellite receivers, over-the-air broadcast receivers, computers or other streaming media receivers, etc.), and one or more clients or content presentation devices 106 (e.g., TVs or other display devices, loudspeakers or other audio output devices, etc.)

In an example implementation, the media content sources 100 could be national broadcasters, such as ABC, NBC, CBS, FOX, HBO, and CNN, the media content distributors 102 could be local affiliates and/or other local content distributors in designated market areas (DMAs), and the receivers 104 and content presentation devices 18 could then be situated at customer premises, such as homes or business establishments. With this or other arrangements, the content sources 100 could deliver media content to the content distributors 102 for distribution to receivers 104 at customer premises, and the content distributors could distribute the media content to the receivers 104 on discrete channels (e.g., particular frequencies or other defined channels). Each receiver could then respond to user input or one or more other triggers by tuning to a selected channel and outputting to a content presentation device 106 the media content that is arriving on the selected channel. And the content presentation device 106 could receive and render the media content (e.g., display or otherwise present the content).

When a media client such as a receiver 104 and/or content presentation device 106 is processing a linear media stream for presentation (e.g., as the media client is rendering the media stream for presentation, outputting the media stream for presentation, and/or otherwise processing the media stream for presentation), it may be useful in certain situations for the media client to perform a special content-related action, i.e., an action related to the content of the media stream.

By way of example, the content-related action could involve initiating an interactive event, such as beginning to superimpose overlay content (e.g., overlay audio and/or video content) that prompts a user to respond in some manner or that otherwise relates to interaction with a user of the media client or of an associated user interface on which content of the media stream is presented.

And as another example, the content-related action could involve dynamically revising a portion of the stream's media content. For example, it may be useful for the media client to dynamically replace an ad or other replaceable segment of the media stream with a replacement ad or with other replacement content, so that when the content is played out to a user, the user would receive the replacement ad or other replacement content in place of the originally included ad or other replaceable segment. As another example, it may be useful for the media client to dynamically supplement a portion of the media content with overlay or split-screen content, such as channel identification, context information, ad content, or the like, so that when the content is being played out to a user, the user would receive the supplemental content together with the originally included content.

Further, it may be desirable for the media client to perform the content-related action at a specific time point within the media stream. For instance, if the media client is to dynamically replace an existing ad or other replaceable segment of the media stream with a replacement ad or other replacement content, it may be desirable for the media client to position the replacement ad or other replacement content at a time in the media stream when the existing ad or other replaceable segment would have started. Likewise, if the media client is to supplement a specific portion of the media content with an overlay related to that portion, it may be desirable for the media client to start the overlay when that portion starts. Other examples are possible as well.

More particularly, the media stream at issue could define a sequence of frames, such as video frames and/or audio frames, and it may be desirable for the media client to perform the content-related action on a frame-accurate basis. For instance, for dynamic content replacement, it may be desirable for the media client to insert the replacement ad or other replacement content in place of the existing ad or other replaceable segment starting precisely at the first frame of the existing ad or other replaceable segment. And for adding an overlay to a specific portion of the media stream, it may be desirable for the media client to start the overlay at or in specific relation to the first frame of that portion of the media stream. Similar rationale may exist for other of content-related actions as well.

Without limitation, the remainder of this disclosure will focus mainly on dynamic ad insertion (DAI), where a media client will dynamically replace playout of a replaceable ad in the media stream with playout of a replacement ad, such as an ad selected based on user demographics or the like. It should be understood that the disclosed principles could apply as well with respect to other content-related actions as well.

In a representative DAI scenario, the media client could comprise a television and/or set top box that is processing for presentation a media stream defining a linear broadcast feed of a particular television channel, e.g., with the media client either currently receiving the media stream from a broadcaster (e.g., over-the-air broadcaster, or cable or satellite MVPD) or having previously received and stored the media stream for later playout, and the replaceable ad might appear at any moment in that media stream. Especially with (but not limited to) a live broadcast such as a sporting event, for instance, the time when the ad appears in such a media stream may be unpredictable. Alternatively, the ad could appear at a specifically scheduled time.

In this scenario, while the media client is processing the media stream for presentation, the media client could be in out-of-band communication with a network server (e.g., through a broadband network connection or otherwise separate from the client's receipt of the channel), and the server could work to prepare the media client to carry out DAI at the appropriate time in the course of the media client's processing of the media stream, such as at the time when the media stream would include the replaceable ad.

To facilitate this, the server could first determine which media stream the media client is processing for presentation and the server could then determine the point when the replaceable ad will appear in that determined media stream. The server could then direct the media client to insert for playout a replacement ad in place of the replaceable ad, starting at that determined point during in the media stream.

Figure 2:
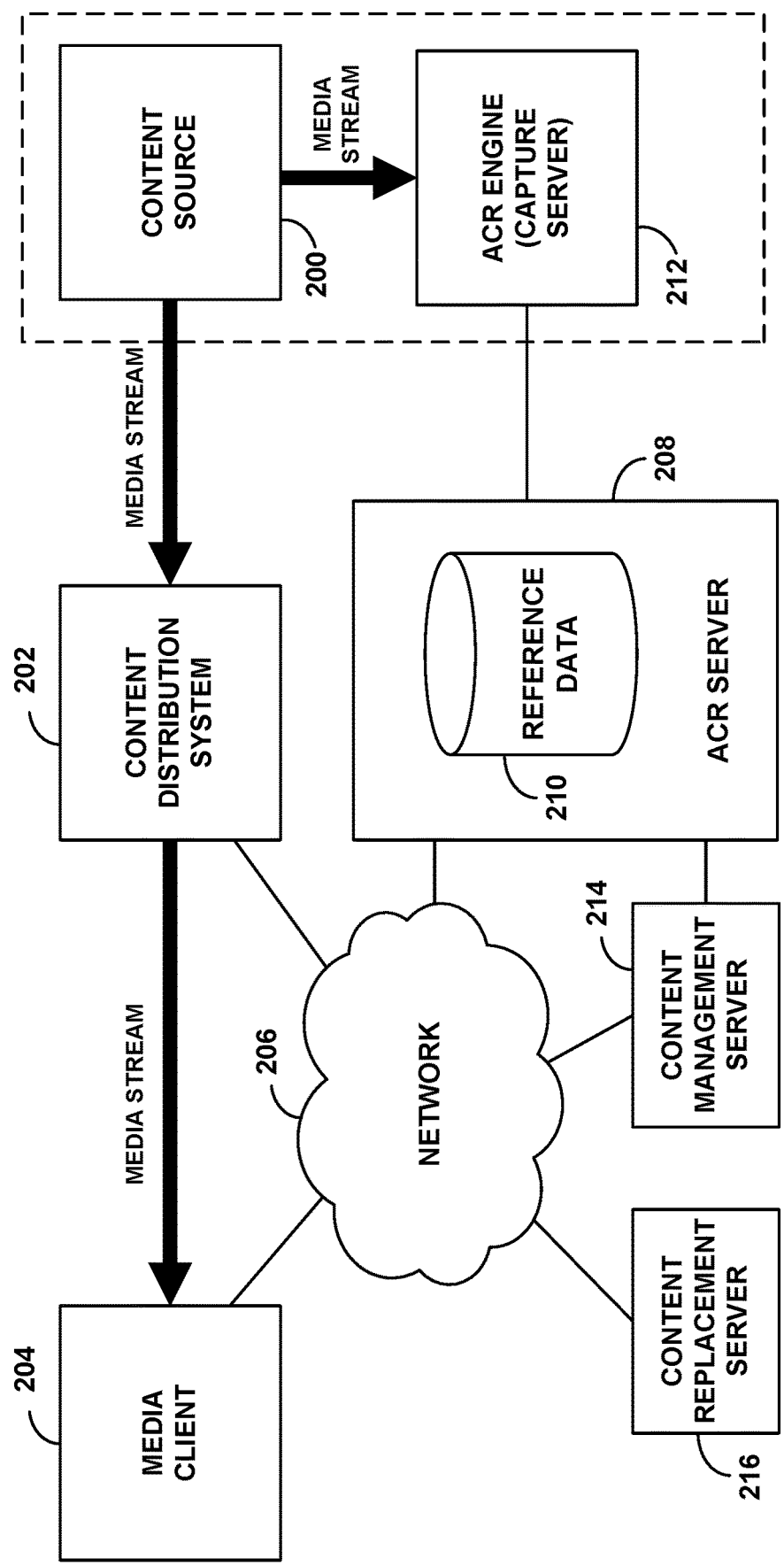
FIG. 2 is another simplified block diagram of an example system in which various disclosed principles can be applied.

FIG. 2 is a simplified block diagram of an example system in which this DAI process could be implemented.

FIG. 2 shows at its top an example media-distribution path extending from a content source 200 to a media client 204 via a content distribution system 202. Without limitation, for instance, the content source 200 could be a national broadcaster such as one of those noted above, the content distribution system 202 could be an MVPD such as a local affiliate of the national broadcaster, and the media client 204 could be a content presentation device such as a TV or the like, and/or a receiver such as a set top box or the like.

With this arrangement, an example media stream flows over the media-distribution path from the content source 200 to the content distribution system 202 and then from the content distribution system 202 to the media client 204. Without limitation, this media stream could comprise and thus define a sequence of digital frames of media content as noted above, perhaps representing a specific channel of content. The content source 200 could convey this media stream to the content distribution system 202 in a packet-based transport stream, by conveying segments of the media stream in payload of transport-stream packets to the intermediary 202. And the content distribution system 202 could then forward the media stream, possibly also in a packet-based transport stream or possibly de-packetized and/or transcoded, to the media client 204 for processing, to facilitate processing by the media client for presentation.

As further shown in FIG. 2, the media client 204 could be interconnected with a communication network 206, which could be a packet-switched network such as the Internet. For instance, the media client could sit as a node on a local area network (LAN) at customer premises, with the media client having an assigned Internet Protocol (IP) address on the LAN and the LAN having an IP address on the network 206. The media client could thus engage in data communication with various entities via the network 206 while the media client is processing the media stream.

Shown accessible via the network 206 (e.g., at a defined IP address on the network) is an automatic content recognition (ACR) server 208 (e.g., combination of servers, including an ACR service), with which the media client could engage in example out-of-band communication, such as IP signaling through network 206 for instance.

The ACR server 208 could be configured to engage in various ACR operations, such as automatically determining an identity of the media stream (e.g., the channel) being processed by the media client, automatically detecting in that media stream an upcoming ad-replacement opportunity, and coordinating implementation of DAI by the media client 204.

To facilitate these or other such operations, the ACR server 208 could be provisioned with reference data 210, which could include digital reference fingerprints of each of various media streams (e.g., each of various known channels) and digital reference fingerprints of each of various replaceable ads that might appear in a given media stream. This reference data could be supplied by the content source 200 and by a content management server 214, among other possibilities.

In an example implementation, the reference fingerprints of each of various known media streams (e.g., each of various known channels) could be established by one or more capture servers that have access to the broadcast channel feeds being distributed by one or more content sources.

For instance, as the content source 200 outputs each of various media streams (e.g., each of various known channels) including the media stream shown in the figure, an ACR engine 212 operating as a capture server at or otherwise associated with the content source 200 could generate digital reference fingerprints, on a per-frame basis or other ongoing basis, respectively representing each such media stream. And the ACR engine 212 could timestamp each reference fingerprint with a reference timestamp that indicates a relative time of the associated frame in a reference timeline of the media stream or according to another reference clock, such as a clock running at the content source. As the ACR engine 212 generates these timestamped reference fingerprints, the ACR engine 212 could then provide the reference fingerprints to the ACR server 208, associating the reference fingerprints of each media stream with a unique identity of that media stream, such as a channel identifier (CID) for instance. (Alternatively, the reference-fingerprint generation could be done at the content distribution system 202, among other possibilities.)

The ACR server 208 could thus receive and store those timestamped digital reference fingerprints along with the associated media-stream identity information as part of the reference data 210. For instance, the ACR server 208 could store the reference fingerprints in a database relationship with their associated media-stream identity information.

Further, in accordance with agreements to facilitate DAI, the content management server 214 could receive copies of each of one or more replaceable ads, and the content management server 214 could generate digital fingerprints representing each such replaceable ad and could provide those digital fingerprints to the ACR server 208. And the ACR server 208 could store those digital fingerprints of the replaceable ads as part of the reference data 210 as well.

Without limitation, an example digital fingerprinting process with respect to video could apply on a per video frame basis and could involve establishing a representation of luminosity and/or other video characteristics. For instance, for a given video frame, a fingerprint generator could programmatically divide the frame into a grid, and the fingerprint generator could measure luminosity of the frame per grid cell and generate a bit string with each bit or series of bits representing luminosity of a respective grid cell, or representing a weighted difference between the luminosity of certain defined pairs of the grid cells, or the like. Further, the fingerprint generator could apply this process continually to generate the digital fingerprint over time as a sequence of fingerprints (e.g., as a fingerprint stream). For instance, the fingerprint generator could apply this process to each frame, to each key frame, periodically, or on another defined basis, with each frame's bit string defining a digital fingerprint and/or with a specified hash, combination or series of such bit strings or other representative values defining a digital fingerprint, on a sliding window basis. Other digital fingerprinting processes could be used as well, further including audio fingerprinting processes.

As the media client processes for presentation the ongoing media stream representing a given channel of content, the media client could likewise generate query digital fingerprints representing frames of the media content of the stream that it is processing, to facilitate ACR. The media client could apply the same digital fingerprinting process that is used to generate the reference fingerprints of the media streams and replacement ads, so as to allow a comparison of the query fingerprints with those reference fingerprints for purposes of ACR and to facilitate DAI. Further, the media client could timestamp each such query fingerprint to represent time, according to the media client's clock, of the frame represented by the query fingerprint.

In an example implementation, the media client could periodically (or otherwise from time to time) transmit over the network 206 to the ACR server a latest set of the query fingerprints that the media client has generated, to enable the ACR server to identify the media stream that the media client is processing.

As the ACR server receives these query fingerprints from the media client, the ACR server could compare the query fingerprints with the media-stream reference fingerprints stored in reference data 210 by the ACR server, in an effort to find a match. And upon finding with sufficient certainty that the query fingerprints match the reference fingerprints associated with a specific media stream (e.g., a specific channel), the ACR server could reasonably conclude that that is the media stream being processed by the media client.

To compare a given query fingerprint with a given reference fingerprint, the ACR server could compare corresponding portions of the fingerprints with each other to determine whether the portions match exactly or within defined tolerances. For example, the ACR server could compute a maximum deviation between the fingerprints and determine if the maximum deviation is within a predefined tolerance. Further, if the fingerprints are binary, this could be a Boolean determination or could involve computing a Hamming distance (as a count of mismatches between respective bit locations in the fingerprints), and if the fingerprints are more complex values, such as decimal values or vectors (e.g., grey values per video frame region), this could involve determining a distance between the values or vectors. Other examples are possible as well.

Once the ACR server identifies the media stream that the client is presenting, the ACR server could determine in various ways when a replaceable ad will appear in that identified media stream, and the ACR server could then transmit to the media client a directive for the media client to insert a replacement ad starting at that point during the media client's processing of the media stream.

In one example, the ACR server could determine a reference time of when the replaceable ad will appear in the media stream, and the server could provide the media client with that reference time.

By way of example, the ACR server may have access to data that specifies a predefined broadcast time of the replaceable ad in the determined media stream, such a time when a distributor of the media stream is scheduled to include the replaceable ad in the media stream. This predefined time could be defined in the reference timeline of the channel or according to another reference time clock, such as a clock running at the distributor. Once the ACR server identifies the media stream that the media client is presenting, the server could thus refer to this data to determine the predefined broadcast time of the replaceable ad. And well in advance of that time, the ACR server could engage in out-of-band signaling to the media client to provide the media client with an indication of the predefined broadcast time of the replaceable ad and with a directive for the media client to present the replacement ad starting at that upcoming time.

Alternatively, the ACR server could apply fingerprint-based ACR as a basis to detect presence of the replaceable ad in the media stream in real time, i.e., as the media stream is en route to the media client. The ACR server could then determine the reference timestamp of the start of the detected replaceable ad and could transmit to the media client a directive for the media client to present the replacement ad starting at the point in the media stream.

This process could take advantage of a time delay that is likely to exist from the point in time when the content source outputs content of the media stream for distribution to the point in time when the media client receives and/or otherwise processes that content of the media stream. Depending on the configuration of the system, this delay could be on the order of 5-10 seconds and could vary from client to client. Given this delay, if the ACR server engages in out-of-band communication with the media client over a relatively high-speed network connection such as through network 206, the ACR server could give the media client adequate advanced notice of the upcoming replaceable ad in the media stream, so that the media client could be prepared to present the replaceable ad at the time the replaceable ad would appear in the media stream that the media client is processing.

In one implementation of this example, for instance, once the ACR server identifies the media stream that the media client is presenting, the ACR server could start to compare the reference fingerprints of that media stream with the fingerprints of various replaceable ads. And upon finding with sufficient certainty that the reference fingerprints of the determined media stream match the fingerprints of a particular replaceable ad, the ACR server could conclude that the replaceable ad is present in the media stream being processed by the media client. The ACR server could then determine from the reference-fingerprint timestamps the reference time in the media stream when the first frame of the replaceable ad appears in the media stream, and the ACR server could transmit to the media client an indication of that time with a directive for the media client to start inserting the replacement ad at that particular time, in place of the replaceable ad.

One issue that may exist with use of reference time in these examples is that the media client's timeline for presentation of the media stream may not match the reference timeline of the media stream, and so the reference time that the ACR server might provide to the media client may not correctly inform the media client of when the replaceable ad will appear in the media stream at the media client.

One basis for this time discrepancy could be the time delay noted above between when the content source outputs content of the media stream for distribution to the point in time when the media client receives and/or otherwise processes that content of the media stream. If the reference time provided by the ACR server represents the start time of the replaceable ad from the broadcaster's perspective, then the time when the replaceable ad would actually appear in the media stream at the media client would be offset from that reference time by the broadcast delay.

Alternatively or additionally, another basis for the time discrepancy could be if the media client is presenting the media stream with time-shifting, such as where the media client previously received and stored the linear feed of the media stream and is now retrieving the feed from storage and presenting it. In that case, the media client's timeline for presentation of the media stream would be offset from the broadcast time of the media stream by at least the duration of that time shifting.

To help overcome this technical issue, the ACR server and/or media client could work to establish a time mapping or "synchronous lock" between reference time and client time. In particular, the ACR server and/or media client could compute an offset between (i) reference time, such as time of broadcast of content of the media stream or time according to a timeline defined along the channel itself and (ii) client time, such as the time the media client presents corresponding content of the media stream. The ACR server and/or media client could then apply this time offset as a basis to translate between reference time and client time, such as to translate a reference time of the start of the replaceable ad in the media stream to client time when the replaceable ad would start as the media client processes the media stream.

The ACR and/or media client could establish this synchronous lock in various ways.

By way of example, the ACR server could determine the time offset by comparing reference and query fingerprint timestamps of one or more instances where the reference fingerprints of the media stream match the query fingerprints of the media stream. In particular, once the ACR server has determined the media stream that the media client is presenting, or in the course of making that determination, the ACR server could perform fingerprint matching to find one or more instances of a reference fingerprint matching a client-provided query fingerprint with sufficient certainty. And for each such match point, the ACR server could compute a difference between the reference-fingerprint timestamp and the query-fingerprint timestamp. The ACR server could then deem the time offset to be that difference computed for a given match point or on average for multiple such match points.

Given this computed time offset, the ACR server could then translate the reference time of when the replaceable ad starts in the media stream to a corresponding client time and could thus convey that client time to the media client as the indication of when the replaceable ad starts and thus when the media client should start to present the replacement ad instead. Alternatively, the ACR server could transmit the computed time offset to the media client, and the media client could then apply that time offset to translate a server-provided reference time of the start of the replaceable ad to a corresponding client time of the start of the replaceable ad, so that the media client could then start inserting the replacement ad at that time.

Alternatively, once the ACR server has identified the media stream being processed by the media client, the ACR server could provide the media client with a set of time-stamped reference fingerprints of the media stream, and the media client could perform client-side fingerprint-matching in order to determine the time offset. Namely, the media client could perform fingerprint matching to find one or more instances of a reference fingerprint matching a client-generated query fingerprint with sufficient certainty. And for each such match point, the media client could compute a difference between the reference fingerprint timestamp and the client fingerprint timestamp. The media client could then deem the time offset to be that difference computed for a given match point or on average for multiple such match points.

With this example, if the media client receives from the ACR server a reference time of when the replaceable ad starts in the media stream, the media client could translate that reference time to a corresponding client time so that the media client could then start to present the replacement ad at that client time. Alternatively, the media client could transmit the computed time offset to the ACR server, and the ACR server could then apply the time offset to reference time of the start of the replaceable ad in the media stream to determine the corresponding client time and could then provide the media client with the determined client time, so that the media client could start to insert the replacement ad at that client time.

In an alternative implementation, the ACR server could use fingerprint-based ACR to detect presence of the replaceable ad in the media stream in real time as the media stream is en route to the media client, and the ACR server could then provide the media client with a set of associated reference fingerprints to enable the media client to perform client-side matching so as to detect when the replaceable ad is about to appear in the media stream and thus when the media client should start inserting the replacement ad.

Namely, once the ACR server has identified the media stream being processed by the media client, the ACR server could then compare reference fingerprints of that identified media stream with predefined fingerprints of various replaceable ads and could thereby detect the presence of a particular replaceable ad in the media stream as discussed above. Having detected the replaceable ad in the media stream, the ACR server could then obtain a set of the reference fingerprints representing frames of the media stream leading up to and including at least the start of the replaceable ad in the media stream. And the ACR server could transmit to the media client those reference fingerprints as well as an indication of which reference fingerprint represents a start of the replaceable ad. In response, the media client could then perform client-side fingerprint matching so as to detect when the replaceable ad is about to appear in the media stream that the media client is processing. And the media client could accordingly insert the replacement ad starting at that detected time point.

This process could also take advantage of the above-noted time delay that would likely exist from the point in time when the distributor outputs content of the media stream for distribution to the point in time when the media client receives and/or otherwise processes that content of the media stream. Here, if the ACR server engages in out-of-band communication with the media client over a relatively high speed network connection, the ACR server could provide the reference fingerprints to the media client sufficiently before the replaceable ad would appear in the media stream at the media client, so that the media client could apply client-side matching and be prepared to start the replacement ad on a frame-accurate basis.

In an example implementation of DAI, the ACR server could also provide the media client with other information to facilitate ad replacement. For instance, the ACR server could provide the media client with an address (e.g., universal resource locator (URL)) or other information that enables the media client to obtain from a content replacement server 216, from local data storage of the media client, or from another location, a replacement ad that the media client should insert in place of the replaceable ad, and with duration and other information to enable the media client to obtain a suitable replacement ad for this purpose. The media client could thus obtain a replacement ad and could accordingly insert the replacement ad in place of the replaceable ad as the media client processes the ongoing media stream for presentation.

Unfortunately, a technical problem that can arise in the above processes is that it may take more time than desired or practical for the ACR server to initially determine through fingerprint-based ACR which media stream the media client is processing, i.e., to initially identify the media stream that the media client is processing. Therefore, it may take more time than desired or practical for the ACR server to determine which reference fingerprints could be used for various purposes noted above—such as for (i) establishing synchronous lock to facilitate determining client time when the media client should start inserting the replacement ad, or (ii) conducting server-side or client-side fingerprint-based ACR to detect the presence of the replaceable ad in the media stream that the media client is processing, among other possibilities.

For instance, it may take more time than desired or practical for the ACR server to search through the reference data 210 in an effort to find media-stream reference fingerprints that match the client-provided query fingerprints with sufficient certainty. Further, in some cases, the ACR server may find with sufficient certainty that the client-provided query fingerprints match reference fingerprints respectively representing each of multiple different media streams (as a multi-match scenario), in which case the ACR server may then need to engage in additional time-consuming processing to determine which of those multiple media streams is the media stream that the media client is presenting.

Unfortunately, if it takes too long for the ACR server to determine which media stream the media client is processing, the ACR may not be able to prepare the media client in a timely manner to carry out DAI as to a given ad-replacement opportunity. Further, this same issue could exist for other types of content-related actions.

The present disclosure provides a useful mechanism that could to help overcome this technical problem. In accordance with the disclosure, as noted above, when a media client is processing for presentation a media stream such as a channel (in real time or with time-shifting), the media client will receive in-band metadata that identifies the media stream and, based on receiving the in-band metadata, will transmit a representation of the metadata through an out-of-band communication to an ACR server or the like, to enable the server to readily determine the media stream that the media client is processing and to take associated action like that discussed above.

In a representative implementation, the act of the media client receiving in-band metadata involves the media client receiving the metadata with (e.g., in or accompanying) the media client's receipt of the media stream, rather than the media client receiving the metadata separate from the media client's receipt of the media stream.

By way of example, in-band metadata could be metadata that is encoded into the media stream itself. For instance, in-band metadata could be steganographically encoded as a watermark (e.g., an audio or video watermark) in the media stream, using any of various watermarking techniques now known or later developed. In that case, the media client could evaluate the media stream to detect the presence of the watermark, and upon detecting the watermark, the media client could decode the watermark and thus read the metadata from the media stream. Alternatively, the metadata could be otherwise encoded in the media stream, such as within a vertical ancillary data (VANC) space of a video frame for instance, in which case the media client could read the metadata from the VANC space of the video frame, among other possibilities.

And as another example, if the media stream is carried in a transport stream (e.g., in a packet-data stream), then the transport stream might carry the metadata within the header of each of one or more transport-stream packets and/or within one or more special packets in the transport stream. In that case, the media client could evaluate the transport stream to detect the presence of the metadata and could then read the metadata from the transport stream.

These or other forms of in-band metadata could be provided using various protocols, such as but not limited to those defined by standards organizations such as the Society of Cable and Telecommunications Engineers (SCTE) (e.g., SCTE 104 or SCTE 35), the Advanced Television Systems Committee (ATSC) (e.g., ATSC 3.0), or the European Telecommunications Standards Institute (e.g., Hybrid Broadcast Broadband (HBB) TV (TS 102 796)), among other possibilities.

As is known in the art, for instance, watermarking involves permanently embedding or otherwise encoding information into media content in a manner that enables the information to be decoded and extracted from the media content by a receiver of the media content but that may be imperceptible to a user to whom the media content is presented. This is in contrast to inserting such information into a packet header or the like without encoding the information into the underlying media content itself. Watermarking permanently changes the media content and may be impossible to remove.

More particularly, watermarking media content could involve encoding into the media content a code that can be mapped to associated information, or perhaps more directly encoding into the media content the associated information. In an example implementation, the watermark code could be on the order of 24 bits, and the watermarking could be done in an audio component of the media content and/or in a video component of the media content, depending on the form of the media content for instance.

Existing audio watermarking techniques include, without limitation, inserting audio energy into the audio signal or otherwise adjusting one or more characteristics of the audio signal in a manner that can be detected by a suitably configured watermark-detection algorithm but that is masked from hearing (e.g., the audio characteristic and/or manner of encoding being sufficient to hide the watermark from human detection)—known as stenographic or psychoacoustic encoding.

Examples of audio watermarks and corresponding watermark detection techniques are described in U.S. Pat. No. 8,359,205 (entitled "Methods and Apparatus to Perform Audio Watermarking and Watermark Detection and Extraction," which issued on Jan. 22, 2013), U.S. Pat. No. 8,369,972 (entitled "Methods and Apparatus to Perform Audio Watermarking Detection and Extraction," which issued on Feb. 5, 2013), U.S. Patent Application Pub. No. 2010/0223062 (entitled "Methods and Apparatus to Perform Audio Watermarking and Watermark Detection and Extraction," which was published on Sep. 2, 2010), U.S. Pat. No. 6,871,180 (entitled "Decoding of Information in Audio Signals," which issued on Mar. 22, 2005), U.S. Pat. No. 5,764,763 (entitled "Apparatus and Methods for Including Codes in Audio Signals and Decoding," which issued on Jun. 9, 1998), U.S. Pat. No. 5,574,962 (entitled "Method and Apparatus for Automatically Identifying a Program Including a Sound Signal," which issued on Nov. 12, 1996), U.S. Pat. No. 5,581,800 (entitled "Method and Apparatus for Automatically Identifying a Program Including a Sound Signal," which issued on Dec. 3, 1996), U.S. Pat. No. 5,787,334 (entitled "Method and Apparatus for Automatically Identifying a Program Including a Sound Signal," which issued on Jul. 28, 1998), and U.S. Pat. No. 5,450,490 (entitled "Apparatus and Methods for Including Codes in Audio Signals and Decoding," which issued on Sep. 12, 1995, all of which are hereby incorporated by reference in their entireties.

Existing video watermarking techniques, on the other hand, involve embedding a code in a video component of the media content in a manner that can be detected by a suitably configured watermark-detection algorithm but that is masked from human visual detection.

Examples of video watermarking techniques include various spatial-domain techniques such as flipping pixels, embedding the watermark into least significant bits, and adding a pseudo-random noise pattern to the video, and various frequency-domain techniques, such as SVD domain watermarking, Discrete Fourier Transform watermarking, Discrete Cosine Transform watermarking, Discrete Wavelet Transform watermarking, and principal component analysis watermarking. Other examples are possible as well.

Any of these or other watermarking techniques could be used for present purposes or otherwise for watermarking in a manner that could facilitate the features presently disclosed.

In an example implementation, a content source, content distributor, or other entity involved with providing the media stream that will ultimately be processed by the media client could provide as in-band metadata a unique identifier of the media stream, by watermarking the media-stream identifier into the media stream itself, by writing the media-stream identifier as transport-stream metadata in a transport stream that also carries the media stream, and/or in another manner. Further, the manner in which the metadata is provided in-band could be changed while the media stream is en route to the media client. For instance, at some point in the media-distribution path along which the media stream flows to the media client, transport-stream metadata could be converted to watermarking, among other possibilities.

To enable the ACR server to quickly correlate this in-band media-stream identifier with the reference fingerprints that represent the media stream, the media-stream identifier could be the same identifier that the reference data 210 specifies for the media stream. For instance, if the media stream represents a particular channel having a particular CID, the media-stream identifier provided as in-band metadata could be that same CID. Alternatively, the in-band media-stream identifier could be a code or other data that can be readily mapped to the same media-stream identifier associated with the reference fingerprints, through a database lookup for instance.

The entity that provides this media-stream identifier as in-band metadata could also do so repeatedly throughout the media stream (e.g., along a duration of the media stream), to enable the media client to readily detect and decode the watermark and obtain the media-stream identifier. For instance, as the media stream progresses, the entity could periodically or otherwise from time to time watermark into the media stream the identifier of the media stream or add the identifier of the media stream as transport-stream metadata to a transport stream carrying the media stream. Further, the entity could do this with predefined placement in the media stream or in the transport stream, and/or with a predefined data structure or one or more other predefined attributes, so that the media client can discover the presence of the in-band metadata by looking for such predefined attributes.

As the media client is processing the media stream for presentation, the media client could thus discover and read the in-band metadata, to readily obtain the identifier of the media stream. And in response, the media client could then readily transmit that obtained media-stream identifier through out-of-band signaling to the ACR server, to enable the ACR server to readily obtain the associated reference fingerprints in order to facilitate useful content-related action.

In an example implementation, to account for possible channel changing or the like, the media client might do this repeatedly, for each in-band instance of the media-stream identifier that the media client discovers as the media stream progresses. Or the media client might not repeat transmission to the ACR server unless and until the in-band media-stream identifier changes or a predefined time period passes.

This out-of-band transmission to the ACR server of the media-stream identifier that the media client obtains from the in-band metadata could involve the media client transmitting the media-stream identifier in a packet-based communication according to any agreed protocol over network 206, to an IP address of the ACR server. Here or in another manner, the media client could thus receive media-stream identifier provided as in-band metadata with the media stream conveyed through a media-distribution path from the content distribution system 202, and the media client could then transmit that obtained media-stream identifier out-of-band, over network 206, to the ACR server.

Upon receipt of this media-channel identification that the media client obtained from the in-band metadata and conveyed out-of-band to the ACR server, the ACR server could then readily obtain the reference fingerprints that represent that particular, identified media stream. For instance, the ACR server could query the reference data 210 based on that media-stream identifier, to readily obtain the reference fingerprints that the reference data associates with that media-stream identifier and thus that represent the identified media stream. Further, based on the media-stream identifier, the ACR server could obtain additional reference fingerprints representing the identified media stream.

The ACR server could then readily make use of the obtained reference fingerprints in any of the ways noted above, among other possibilities, to facilitate a content-related action. For instance, the ACR server could use the obtained reference fingerprints (i) as a basis to establish synchronous lock in order to facilitate a determination of client time when the media client should start presenting a replacement ad, and/or (ii) as a basis for server-side or client-side fingerprint-based ACR to detect the presence of a replaceable ad in the media stream that the media client is processing for presentation, among other possibilities.

Conveniently, this process could thus enable the ACR server to obtain the reference fingerprints that represent the media stream being processed by the media client, without a need for the ACR server to perform query/reference fingerprint matching to determine which reference fingerprints match client-generated query fingerprints representing the media stream. That said, an alternative implementation could additionally involve matching of query and reference fingerprints for one reason or another.

Figure 3:
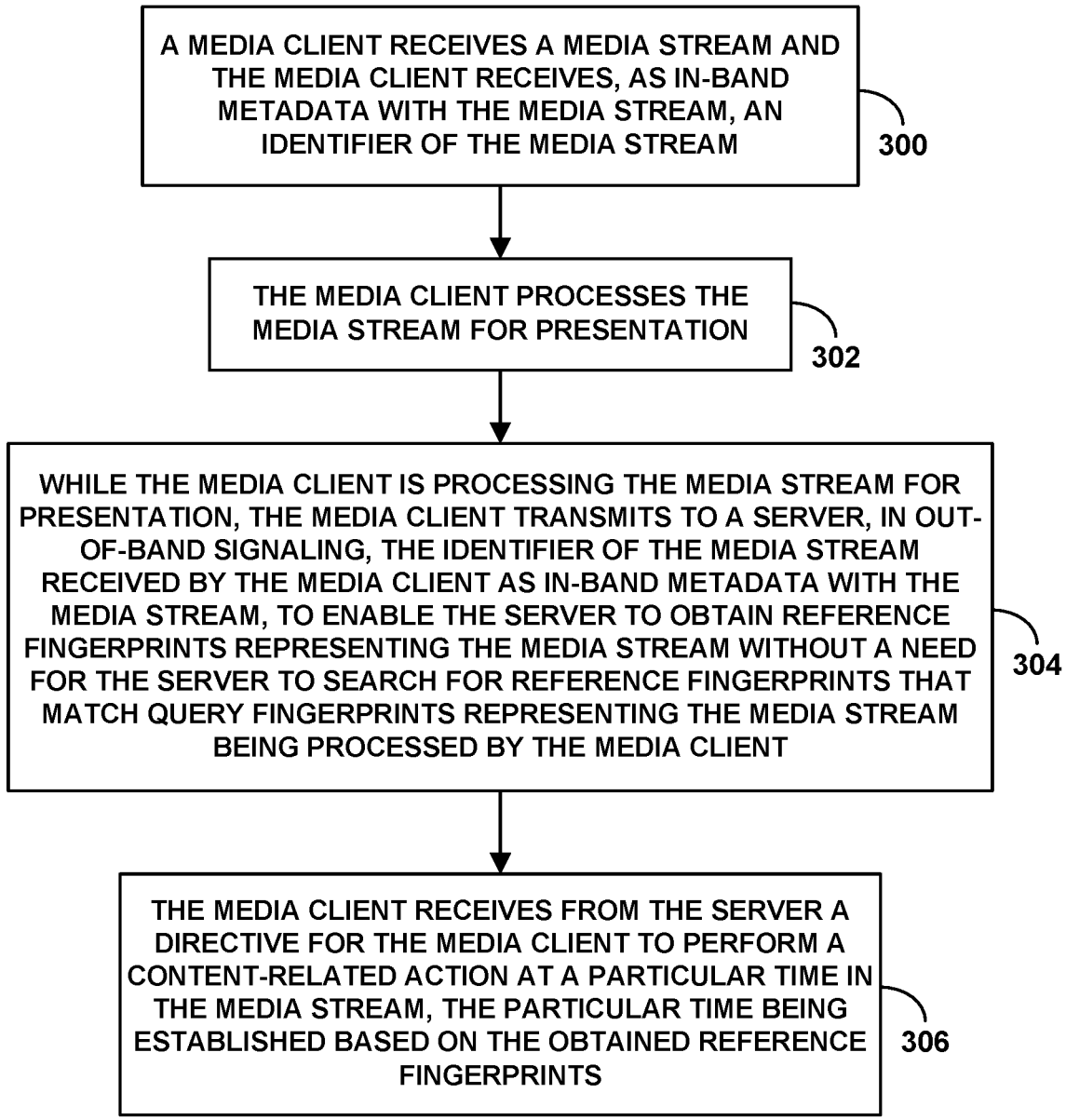
FIG. 3 is a flow chart depicting a method that could be carried out in accordance with the disclosure.

FIG. 3 is a flow chart depicting an example method that can be carried out in accordance with the present disclosure.

As shown in FIG. 3, at block 300, the method includes a media client receiving a media stream (e.g., a television channel) and the media client receiving, as in-band metadata with the media stream, an identifier of the media stream. Further, at block 302, which could occur in parallel with block 300, the method includes the media client processing the media stream for presentation. Still further, at block 304, the method includes, while the media client is processing the media stream for presentation, the media client transmitting to a server, in out-of-band signaling, the identifier of the media stream received by the media client as in-band metadata with the media stream, to enable the server to obtain reference fingerprints representing the media stream without a need for the server to search for reference fingerprints that match query fingerprints representing the media stream being processed by the media client. Yet further, at block 306, the method includes the media client receiving from the server a directive for the media client to perform a content-related action at a particular time in the media stream, the particular time being established based on the obtained reference fingerprints.

In line with the discussion above, the content-related action in this method could involve dynamic content revision, such as DAI, among other possibilities.

Further, as discussed above, the act of the media client receiving the identifier as in-band metadata with the media stream could involve the media client receiving the identifier steganographically encoded as a watermark in the media stream and/or the media client receiving the identifier carried in a transport stream that carries the media stream to the media client. And as discussed above, the out-of-band-signaling could involve signaling over a broadband network connection or other optimally high-speed communication interface.

Still further, as discussed above, the media client could include a content presentation device, in which case the processing of the media stream for presentation could comprise the media client presenting content of the media stream on a user interface and/or otherwise processing content of the media stream for such presentation. Alternatively or additionally, the media client could include another device such as a set top box or other receiver interworking with a content presentation device or other associated device, in which case the processing of the media stream for presentation could comprise outputting of the media stream for presentation by the associated device and/or otherwise processing content of the media stream to facilitate presentation of the content.

Further, the act of the media client processing the media stream for presentation could also comprise the act of the media stream receiving the media stream, among other possibilities.

As additionally discussed above, the act of enabling the server to obtain the reference fingerprints representing the media stream could enable establishment of synchronous lock that maps reference time to client time. And establishing of the synchronous lock could in turn enable translating a reference time of the content-related action to a client time of the content-related action, so as to facilitate carrying out the content-related action at a desired time in the media stream.

Alternatively or additionally, the act of enabling the server to obtain the reference fingerprints representing the media stream could enable the server to perform fingerprint comparison between a replaceable content segment (e.g., a replaceable ad) and the obtained reference fingerprints, to detect presence of the replaceable content segment in the media stream, which could facilitate dynamic content revision, among other possibilities.

Various other features described above can be applied in this context as well, and vice versa.

Figure 4:
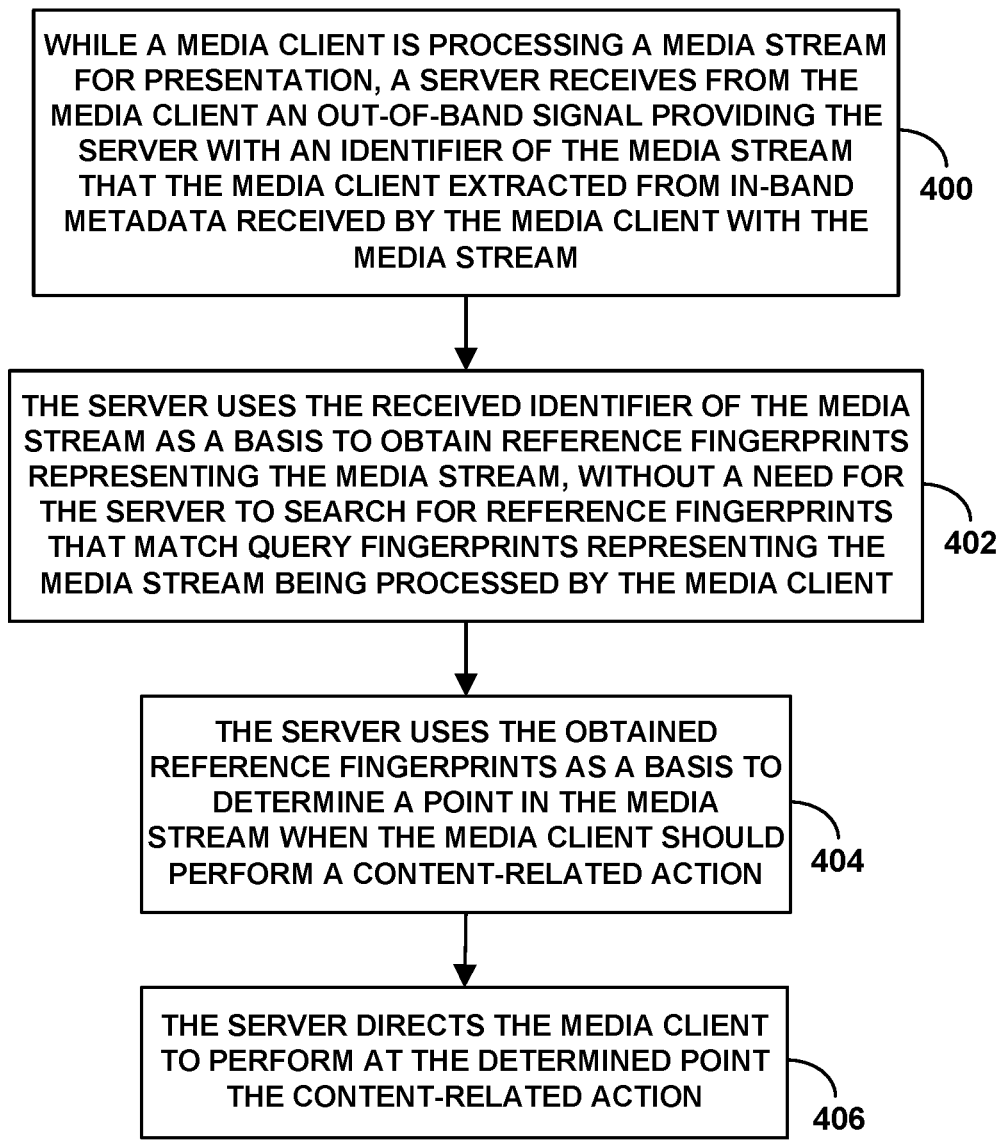
FIG. 4 is another flow chart depicting a method that could be carried out in accordance with the disclosure.

FIG. 4 is next another flow chart depicting a method that could be carried out in accordance with the present disclosure.

As shown in FIG. 4, at block 400, the method includes, while a media client is processing a media stream for presentation, a server receiving from the media client an out-of-band signal providing the server with an identifier of the media stream that the media client extracted from in-band metadata received by the media client with the media stream. At block 402, the method then includes the server using the received identifier of the media stream as a basis to obtain reference fingerprints representing the media stream, without a need for the server to search for reference fingerprints that match query fingerprints representing the media stream being processed by the media client. Further, at block 404, the method includes the server using the obtained reference fingerprints as a basis to determine a point in the media stream when the media client should perform a content-related action. And at block 406, the method includes the server directing the media client to perform at the determined point the content-related action.

Various features discussed above can be applied in this context as well, and vice versa. Without limitation, for instance, the content-related action could include DAI or other dynamic content revision.

Figure 5:
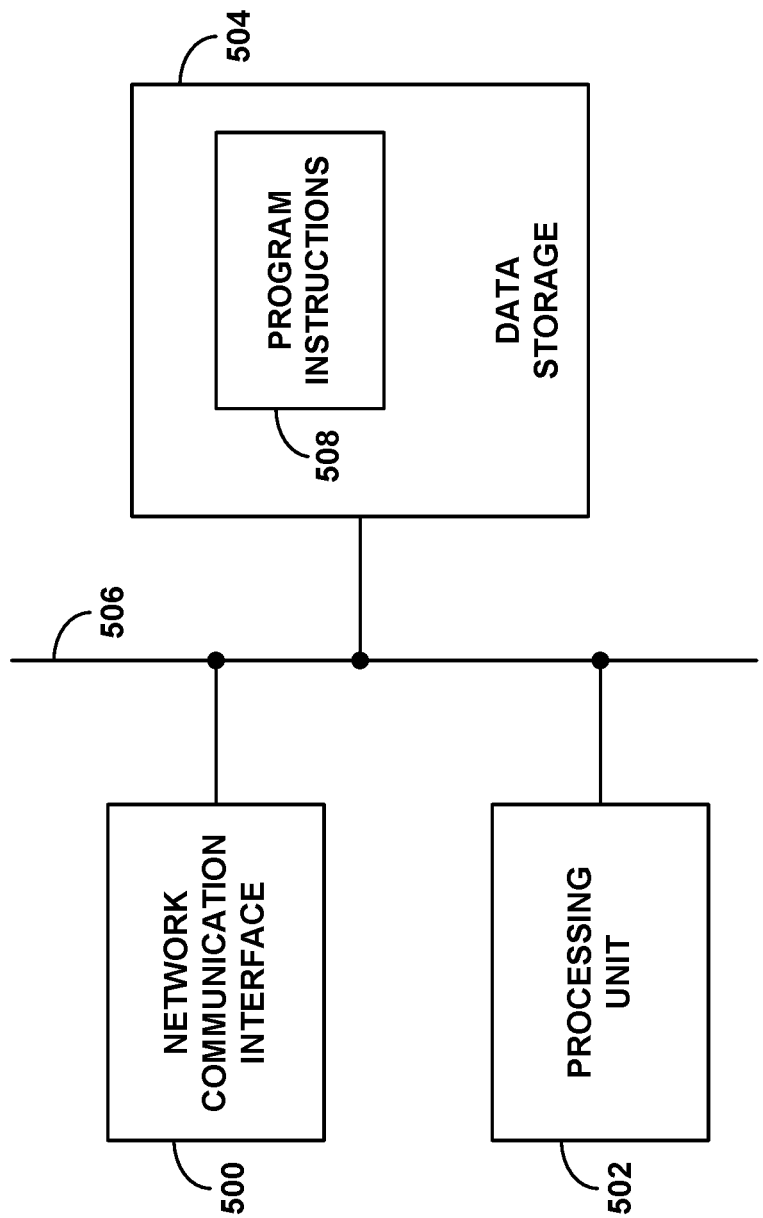
FIG. 5 is a simplified block diagram of an example computing system that could operate in accordance with the disclosure.

FIG. 5 is a simplified block diagram of a computing system that could operate in accordance with the present disclosure. This computing system could represent a server such as the ACR server 208 discussed above, for instance, among other possibilities.

As shown in FIG. 5, the computing system includes a network communication interface 500, a processing unit 502, and non-transitory data storage 504, any or all of which could be integrated together or, as shown, communicatively linked together by a system bus, network, or other connection mechanism 506.

The network communication interface 500 could comprise one or more network connection mechanisms to facilitate communication with one or more other entities on a network such as network 206 for instance. Each such network communication interface could comprise a wireless or wired Ethernet interface or other type of network interface, for engaging in IP communication and/or other type of network communication, among other possibilities.

The processing unit 502 could comprise one or more general purpose processors (e.g., microprocessors) and/or one or more specialized processors (e.g., application specific integrated circuits). And the non-transitory data storage 504 could comprise one or more volatile and/or non-volatile storage components, such as optical, magnetic, or flash storage for instance. Further, as shown, the data storage 504 of the example computing system stores or otherwise embodies program instructions 508. These program instructions could be executable by the processing unit 502 to carry out (e.g., to cause the computing system to carry out) various operations described herein. For instance, if the computing system represents the ACR server 208, the instructions could be executable to carry out various ACR-server operations discussed above.

Various features discussed above can be implemented in this context as well, and vice versa.

Finally, FIG. 6 is a simplified block diagram of an example media client, operable in accordance with the present disclosure. This media device could take various forms as discussed above, such as a content presentation device 106 and/or a receiver 104, and it could also be a combination of multiple such devices, perhaps a content presentation device having an integrated receiver, among other possibilities.

As shown in FIG. 6, the example media client could include a content communication interface 600, a content presentation interface 602, a network communication interface 604, a processing unit 606, and non-transitory data storage 608, any or all of which could be integrated together or, as shown, communicatively linked together by a system bus, network, or other connection mechanism 610.

The content communication interface 600 could comprise a physical communication interface for receiving and/or outputting media content, such as a media stream. As such, the content communication interface could include one or more wired and/or wireless interfaces for establishing communication with and receiving media content in analog or digital through a media-distribution path and, in some implementations, for outputting received media content in analog or digital form for receipt by an associated entity. Thus, the content communication interface might include interfaces such as coaxial cable connections, antennas, receivers, tuners, or the like, for receiving media content from a content distributor, and local communication interfaces compliant with protocols such as DVI, HDMI, VGA, USB, BLUETOOTH, WIFI, among numerous others for outputting media content to associated devices. Other examples could also be possible.

The content presentation interface 602, which might be included in an end-user content presentation device, could comprise one or more components to facilitate presentation of the received media content. By way of example, the content presentation interface 602 could comprise a user interface such as a display screen and/or a loudspeaker, as well as one or more drivers or other components for processing the received media content to facilitate presentation of the content on the user interface.

The network communication interface 604 could comprise a network connection mechanism to facilitate communication on a network such as network 206 for instance, and/or for engaging in direct or networked communication with one or more other local or remote entities. As such, the network communication interface could comprise a wireless or wired Ethernet interface or other type of network interface, for engaging in IP communication and/or other type of network communication.

The processing unit 606 could then comprise one or more general purpose processors (e.g., microprocessors) and/or one or more specialized processors (e.g., application specific integrated circuits). And the non-transitory data storage 608 could comprise one or more volatile and/or non-volatile storage components, such as optical, magnetic, or flash storage. Further, the data storage 608 stores program instructions 612, which could be executable by processing unit 606 to carry out (e.g., to cause the media client to carry out) various operations described herein.

For instance, these operations could include receiving, through the content communication interface, a media stream, and receiving, through the content communication interface, as in-band metadata with the media stream, an identifier of the media stream. Further, the operations could include processing the media stream for presentation. And the operations could include, while processing the media stream for presentation, transmitting to a server, in out-of-band signaling through the network communication interface, the identifier of the media stream received as in-band metadata with the media stream, to enable the server to obtain reference fingerprints representing the media stream without a need for the server to search for reference fingerprints that match query fingerprints representing the media stream being processed for presentation. And the operations could include receiving from the server, through the network communication interface, a directive for the media client to perform a content-related action at a particular time in the media stream, the particular time being established based on the obtained reference fingerprints.

Various features described above can be implemented in this context as well, and vice versa.

Where the present disclosure refers to individual devices, servers, modules, or other entities, the disclosure also contemplates the possibility of each such entity being a single entity or being a combination of multiple entities. For instance, a given entity could comprise a platform or system including multiple devices configured to interwork together or to operate separately or in another manner.

The present disclosure also contemplates one or more computer readable media being encoded with, storing, or otherwise embodying program instructions executable by a processing unit (e.g., one or more processors) to carry out various described operations.

Exemplary embodiments have been described above. Those skilled in the art will understand, however, that changes and modifications may be made to these embodiments without departing from the true scope and spirit of the invention.

What is claimed is:

1. A method comprising:
    receiving by a media client a media stream, and receiving by the media client, as in-band metadata with the media stream, an identifier of the media stream;
    processing by the media client the media stream for presentation; and
    while processing by the media client the media stream for presentation, transmitting by the media client to a server, in out-of-band signaling, the identifier of the media stream received by the media client as in-band metadata with the media stream, to enable the server to obtain, based on a lookup keyed to the identifier, reference fingerprints representing the media stream without a need for the server to search for reference fingerprints that match query fingerprints representing the media stream being processed by the media client, wherein obtaining the reference fingerprints based on the lookup keyed to the identifier comprises referring to predefined reference data that associates various identifiers with respective reference fingerprints, to determine, based on the reference data, the reference fingerprints with which the identifier is associated.

2. The method of claim 1, further comprising:
    receiving by the media client from the server a directive for the media client to perform a content-related action at a particular time in the media stream, wherein the particular time is established based on the obtained reference fingerprints.

3. The method of claim 2, wherein the content-related action comprises dynamic ad insertion.

4. The method of claim 1, wherein receiving by the media client the identifier as in-band metadata with the media stream comprises receiving by the media client the identifier steganographically encoded as a watermark in the media stream.

5. The method of claim 1, wherein receiving by the media client the identifier as in-band metadata with the media stream comprises receiving by the media client the identifier carried in a transport stream that carries the media stream to the media client.

6. The method of claim 1, wherein the out-of-band signaling comprises signaling over a broadband network connection.

7. The method of claim 1, wherein the media client comprises a content presentation device, and wherein the processing of the media stream for presentation comprises the media client presenting content of the media stream on a user interface.

8. The method of claim 1, wherein processing of the media stream for presentation comprises outputting the media stream for presentation by an associated device.

9. The method of claim 1, wherein enabling the server to obtain the reference fingerprints representing the media stream enables establishment of synchronous lock that maps reference time to client time, wherein establishing of the synchronous lock enables translating a reference time of a content-related action to a client time of the content-related action.

10. The method of claim 1, wherein enabling the server to obtain the reference fingerprints representing the media stream enables the server to perform fingerprint comparison between a replaceable content segment and the obtained reference fingerprints, to detect presence of the replaceable content segment in the media stream.

11. The method of claim 1, wherein the media stream comprises a television channel.

12. A media client comprising:
    a content communication interface;
    a network communication interface;
    a processing unit;
    non-transitory data storage; and
    program instructions stored in the non-transitory data storage and executable by the processing unit to carry out operations including:
        receiving, through the content communication interface, a media stream,
        receiving, through the content communication interface, as in-band metadata with the media stream, an identifier of the media stream,
        processing the media stream for presentation,
        while processing the media stream for presentation, transmitting to a server, in out-of-band signaling through the network communication interface, the identifier of the media stream received as in-band metadata with the media stream, to enable the server to obtain, based on a lookup keyed to the identifier, reference fingerprints representing the media stream without a need for the server to search for reference fingerprints that match query fingerprints representing the media stream being processed for presentation, wherein obtaining the reference fingerprints based on the lookup keyed to the identifier comprises referring to predefined reference data that associates various identifiers with respective reference fingerprints, to determine, based on the reference data, the reference fingerprints with which the identifier is associated, and receiving from the server, through the network communication interface, a directive for the media client to perform a content-related action at a particular time in the media stream, wherein the particular time is established based on the obtained reference fingerprints.

13. The media client of claim 12, wherein the content-related action comprises dynamic ad insertion.

14. The media client of claim 12, wherein receiving the identifier as in-band metadata with the media stream comprises receiving the identifier steganographically encoded as a watermark in the media stream.

15. The media client of claim 12, wherein receiving by the media client the identifier as in-band metadata with the media stream comprises receiving by the media client the identifier carried in a transport stream that carries the media stream to the media client.

16. The media client of claim 12, wherein enabling the server to obtain the reference fingerprints representing the media stream enables establishment of synchronous lock that maps reference time to client time, wherein establishing of the synchronous lock enables translating a reference time of the content-related action to a client time of the content related action.

17. The media client of claim 12, wherein enabling the server to obtain the reference fingerprints representing the media stream enables the server to perform fingerprint comparison between a replaceable content segment and the obtained reference fingerprints, to detect presence of the replaceable content segment in the media stream.

18. A method comprising:
while a media client is processing a media stream for presentation, receiving by a server from the media client an out-of-band signal providing the server with an identifier of the media stream that the media client extracted from in-band metadata received by the media client with the media stream;

using by the server the received identifier of the media stream as a basis to obtain, based on a lookup keyed to the identifier, reference fingerprints representing the media stream, without a need for the server to search for reference fingerprints that match query fingerprints representing the media stream being processed by the media client, wherein using the received identifier as a basis to obtain the reference fingerprints based on the lookup keyed to the identifier comprises referring to predefined reference data that associates various identifiers with respective reference fingerprints, to determine, based on the reference data, the reference fingerprints with which the identifier is associated;

using by the server the obtained reference fingerprints as a basis to determine a point in the media stream when the media client should perform a content-related action; and directing by the server the media client to perform at the determined point the content-related action.

19. The method of claim 18, wherein the content-related action comprises dynamic ad insertion.

20. The method of claim 18, wherein the identifier of the media stream that the media client extracted from in-band metadata received by the media client with the media stream comprises an identifier that the media client extracted from a watermark in the media stream.

21. Non-transitory data storage embodying program instructions executable by one or more processors to carry out operations including:
while a media client is processing a media stream for presentation, receiving from the media client an out-of-band signal providing an identifier of the media stream that the media client extracted from in-band metadata received by the media client with the media stream;

using the received identifier of the media stream as a basis to obtain, based on a lookup keyed to the identifier, reference fingerprints representing the media stream, without a need to search for reference fingerprints that match query fingerprints representing the media stream being processed by the media client, wherein using the received identifier as a basis to obtain the reference fingerprints based on the lookup keyed to the identifier comprises referring to predefined reference data that associates various identifiers with respective reference fingerprints, to determine, based on the reference data, the reference fingerprints with which the identifier is associated;

using the obtained reference fingerprints as a basis to determine a point in the media stream when the media client should perform a content-related action; and directing the media client to perform, at the determined point, the content-related action.

* * * * *